United States Patent [19]
Nemschoff

[11] 3,841,426
[45] Oct. 15, 1974

[54] ENGINE ISOLATION SYSTEM

[75] Inventor: Mark S. Nemschoff, Mequon, Wis.

[73] Assignee: FMC Corporation, San Jose, Calif.

[22] Filed: Dec. 7, 1972

[21] Appl. No.: 313,059

[52] U.S. Cl. ............................. 180/64 R, 248/3
[51] Int. Cl. ...................................... B60k 5/00
[58] Field of Search ............ 186/64 R, 64 M, 54 F; 248/3, 6, 7, 8, 9

[56] References Cited
UNITED STATES PATENTS

| | | | |
|---|---|---|---|
| 1,878,976 | 9/1932 | Lesage | 180/33 A |
| 2,084,080 | 6/1937 | D'Aubarede | 180/64 R |
| 2,086,370 | 7/1937 | Taub | 248/7 |
| 2,300,631 | 11/1942 | Ormsby | 180/64 R |
| 2,781,990 | 2/1957 | Via | 248/9 |
| 2,953,336 | 9/1960 | Etchells | 180/64 R |
| 3,164,342 | 1/1965 | Jacobsen | 248/3 |
| 3,398,807 | 8/1968 | Berger | 180/64 R |
| 3,463,259 | 8/1969 | Dangauthier | 180/54 R |

Primary Examiner—David Schonberg
Assistant Examiner—David M. Mitchell
Attorney, Agent, or Firm—A. J. Moore; C. E. Tripp

[57] ABSTRACT

An arrangement of resilient mounts located with respect to the exterior forces acting on an engine for isolating and damping vibration between the engine of a garden tractor or the like and its chassis. The resilient portions of the resilient mounts lies in a generally horizontal plane that is orthogonal to a resultant force vector and intersects a center of dynamic forces within the engine. The resilient mounts are also spaced equal distances from the center of dynamic forces. The resultant force vector is equal in magnitude and opposite in direction to the vector sum of the weight force of the engine and the exterior forces acting on the engine due to its power output. The center of dynamic forces is that point through which the resultant force vector must act in order to balance the weight force of the engine plus the exterior forces acting on the engine due to its power output.

7 Claims, 6 Drawing Figures

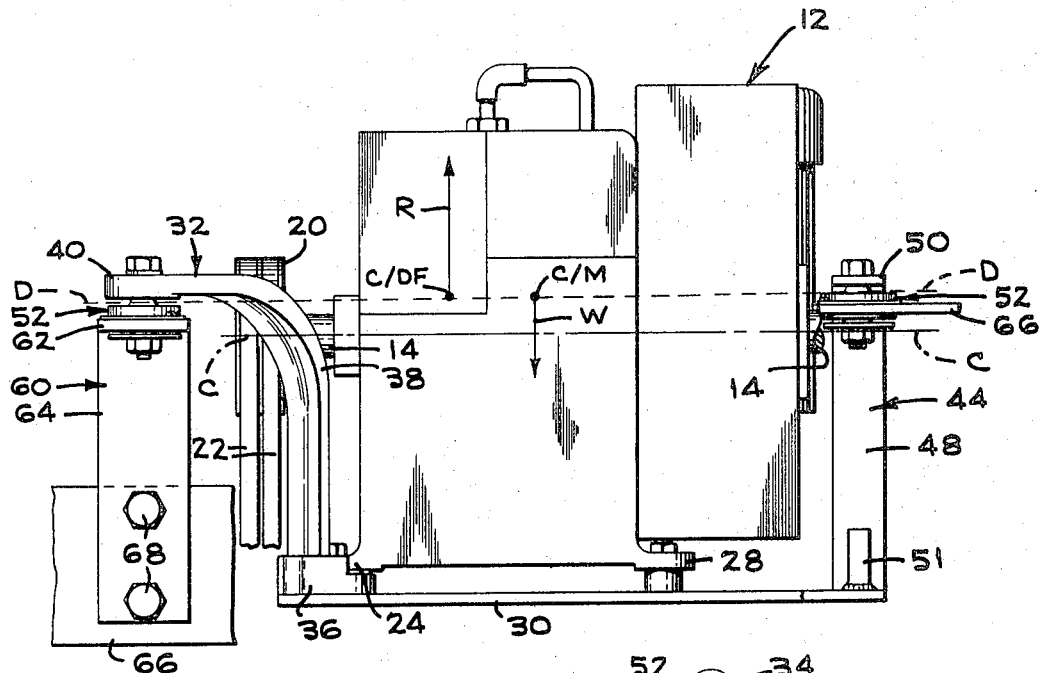
FIG_3
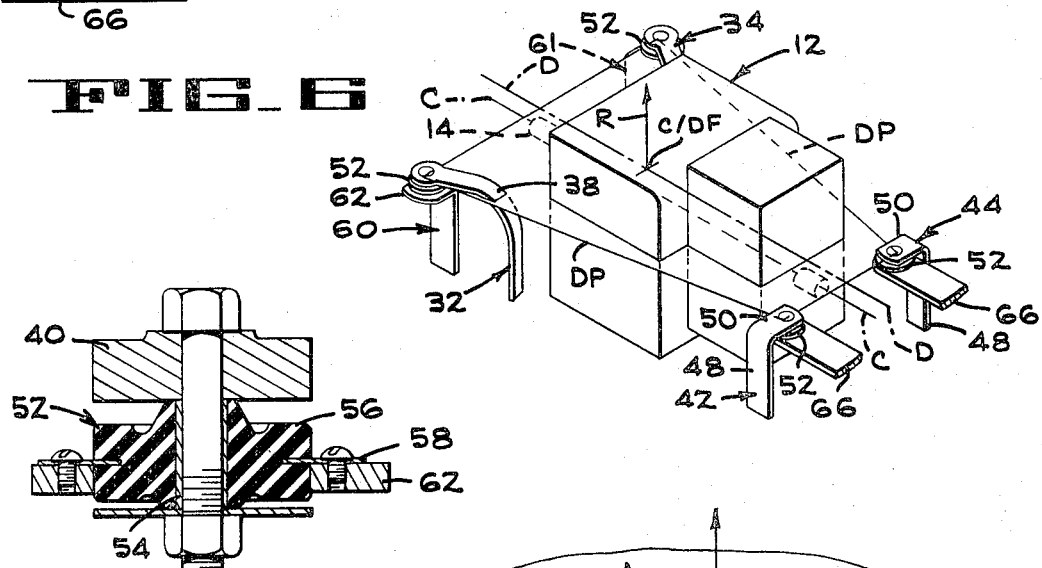
FIG_6
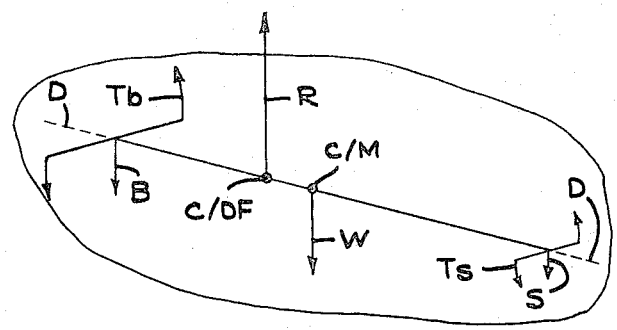
FIG_4
FIG_5

ENGINE ISOLATION SYSTEM

CROSS REFERENCE TO RELATED APPLICATIONS

The engine isolation system of the present invention is intended for use in the type of tractor disclosed in U.S. Pat. application Ser. No. 307,918 which was filed on Nov. 20, 1972 by Joseph A Federspiel; said application being assigned to the assignee of the present invention.

BACKGROUND OF THE INVENTION

1. Field of the Invention

This invention relates to engines and motors and more particularly to the arrangement of engine mounts for these engines and motors of garden tractors or the like.

2. Description of the Prior Art

In general, engine mounts have primarily taken the form of rubber cushions placed in various orientations to support the engine on its chassis and to isolate vibration from the engine to the chassis. The rubber cushions are usually oriented toward the center of gravity of the engine.

For some time electrical generators, air compressors, and hydraulic pumps have been mounted on rubber cushions located about the centers of gravity of the units. In these installations the rubber cushions were located on flat, horizontal planes defined by the dynamic forces acting on the units. Flexible conduits, rubber hoses, and electrical wires which did not substantially load the cushions transmitted the power created by the engines away from the units. None of these installations contemplated the problem of transmitting power away from the engine with a mechanical drive that subjects the rubber cushions to differing loads because of the power output.

The most pertinent reference to the engine isolation system is U.S. Pat. No. 2,084,080 issued on June 15, 1937 to d'Aubarede for an engine mounting. d'Aubarede's engine mounting system locates the engine mounts in a plane so that the engine is free to oscillate about its natural oscillation axes. Another pertinent reference is U.S. Pat. No. 2,034,764 issued on Mar. 24, 1936 to Lee. This reference discloses a three-point engine mounting system in which the engine mounts are positioned about an axis passing through the center mass of the engine and through a center of vibration forces in the engine.

In these two references the engine mounts were used with automobile engines each having a drive shaft to mechanically transmit power away from the engine. Such drive shafts load the engine mounts by the reaction torque to the power output. One lateral side of the horizontal array of mounts is loaded upward by one half of the torque, and the other lateral side of the mount array is loaded downward by one half of the torque. The output forces of these drive shafts do not vertically load the engine mounts to any appreciable extent. The vertical loading on these engine mounts comes from the static weight of the engine itself due to its mass. Thus, non of these references discloses an arrangement of engine mounts for an engine subjected to substantial vertical loading by a mechanical output drive.

SUMMARY OF THE INVENTION

Internal combustion engines are used to generate usable power for many applications. During operation these engines can also generate a substantial amount of vibration and noise. The vibration comes from both the large reciprocating and rotating masses within the engine and also from the inherent imbalance of the combustion pressure forces acting on the pistons. The noise that is not from the exhaust comes primarily from the mechanical contact of the moving mechanical members of the engine and from the transmission of vibration between the engine and the chassis. In order to prevent this undesirable transmission of vibration from the engine to the chassis as well as from the chassis to the engine, and also to damp out the vibration already present in the engine, vibration absorbing engine mounts are used. The engine mounts resiliently dampen vibrations between the engine and the chassis. The engine mounts are also used to support the engine in place so that the engine does not break free of the chassis and damage nearby components.

The engine isolation system of the present invention is an arrangement of vibration damping members located about an engine in order to isolate its vibration. The vibration damping members include flexible, resilient mounts that are located between the engine and the chassis. The location of these flexible, resilient mounts describes a generally horizontal plane that is orthogonal to the resultant force vector and intersects a center of dynamic forces within the engine. The resultant force vector is equal in magnitude and opposite in direction to the vector sum of the weight force of the engine and the exterior forces acting on the engine due to its power output. The center of dynamic forces is that point through which the resultant force vector must act in order to balance the weight force of the engine and the exterior forces acting on the engine due to its power output.

There are many exterior forces acting on the engine due to the engine's external power output. These forces include the vertical loading from the belt tension plus uneven power loads on belt runs between two pulleys in a belt drive assembly. Also there is the torque reaction force on the cranks shaft of the engine due to the driving pulley and/or a drive shaft. The weight of a drive shaft assembly would also make a small contribution to the vertical loading.

The engine isolation system of the present invention is able to accommodate all of these different external forces and torques acting on the engine. It is to be understood that the system will also isolate forces acting outside of the vertical plane, such as the lateral thrust from a laterally mounted pulley. Moreover, the system resiliently dampens vibrations as these external forces individually vary from zero to their maximum magnitude. In addition, the system permits different styles and models of engine to be interchangeably used with the same mounting array. Thus, the engine isolation system permits a wide range of operational flexibility.

In summary, the Engine Isolation System locates the resilient damping elements with respect to the forces imposed upon the engine due to its external power output. The engine is thus floated about its dynamic center of gravity and the power is extracted from a resiliently damped, floating mass. Structure born noise and vibration is thereby substantially reduced. Whereas, in the past, engine mounting systems have always positioned the flexible mounts with respect to the forces generated internally, within the engine, this engine isolation system places its mounts with respect to only the weight force of the engine and the forces acting outside of the engine itself in response to its power output.

It is therefore an object of the present invention to provide an engine isolation system which resiliently supports the engine about its dynamic center of force.

Another object of the invention is to provide an engine isolation system which applies substantially equal forces during normal operation to all of its resilient mounts thus enabling a plurality of identical mounts to be used.

BRIEF DESCRIPTION OF THE DRAWINGS

FIG. 3 is a side elevation broken away and partially in section, taken along line 3-3 of FIG. 2 of the engine isolation system mounted on the frame members of a chassis;

FIG. 4 is a vertical section taken along line 4—4 of FIG. 2 of a flexible, resilient engine mount for the engine isolation system;

FIG. 5 is a vector diagram in perspective of the forces in the engine isolation system; and FIG. 6 is a diagrammatic perspective of the engine isolation system showing the dynamic plane passing through the resilient portions of the engine mounts.

DESCRIPTION OF THE PREFERRED EMBODIMENT

Figure 1:
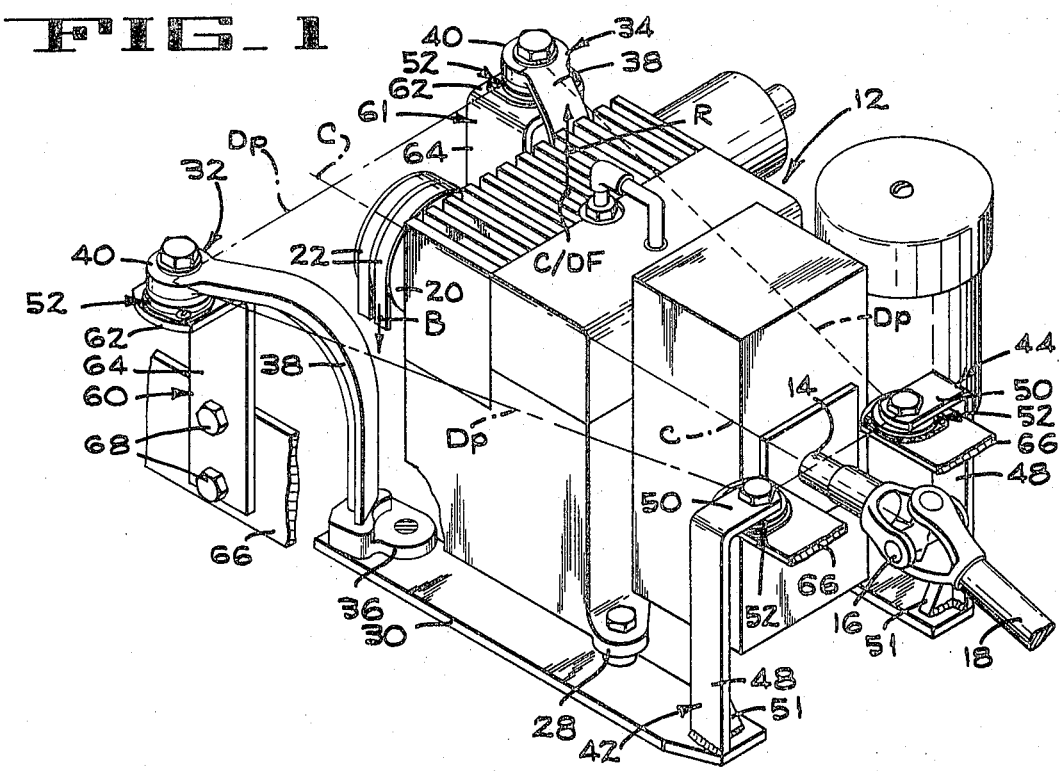
FIG. 1 is a diagrammatic perspective of the engine isolation system mounted on the frame members of a chassis, certain parts being broken away and others shown in section.

Referring more particularly to the drawings, in FIG. 1 reference numeral 12 generally indicates an internal combustion engine. The engine is preferably relatively small, air cooled, and gasoline powered. It is understood, however, that the engine isolation system is not limited to small internal combustion engines but may include any power plant mountable on the chassis of a vehicle; including electric motors, turbines, and steam engines. The engine 12 operatively turns a crankshaft 14. The crankshaft extends longitudinally in the engine along axis C—C and projects outwardly from both the forward and rear ends of the engine. For the purposes of identification, the front of the engine is that portion of the engine through which the crankshaft 14 protrudes to the left in FIG. 2 and the rear of the engine is that portion of the engine through which the crankshaft protrudes to the right in FIG. 2. A universal joint 16 and a drive shaft 18 are coupled to the rear end of the crankshaft 14. The universal joint and drive shaft are of conventional construction and connect the driving wheels of a vehicle, such as a garden tractor, (not shown) to the engine. At the front end of the crankshaft 14 is rigidly mounted a pulley 20. The pulley drives two belts 22 which are operatively connected to a driven pulley (not shown). The driven pulley may be connected to any suitable apparatus requiring output power from the engine.

The engine 12 has four feet 24,26,28,29 for rigidly mounting the engine to two bed plates 30,31. Rigidly bolted between the front feet 24,26 and the bed plates 30,31 are two front mounting arms 32,34. Each front mounting arm includes an engine mounting pad 36, an arcuate medial portion 38 and a chassis mounting pad 40. The engine mounting pad 36 is bolted between a foot of the engine and a bed plate. The arcuate medial portion 38 is generally T-shaped in cross section and extends diagonally from the engine. The chassis mounting pad 40 is operatively connected to the chassis as hereinafter described. The front mounting arms 32,34 and the bed plates 30,31 can be constructed from any suitable, rigid, structural material including steel.

Bolted to the two rear feet 28,29 of the engine 12 are the two bed plates 30,31 that extend horizontally rearward and have weldably attached thereon two rear mounting arms 42,44. Each rear mounting arm includes a medial portion 48 and a chassis mounting pad 50. The medial portion 48 is rectangular in cross section and extends vertically from the bed plate where the medial portion is welded and stiffened with a small web 51. The chassis mounting pad 50 extends horizontally toward the crankshaft 14 and is operatively connected to the chassis as hereinafter described. The rear mounting arms and webs can be constructed of any rigid, structural material including steel.

Bolted to the chassis mounting pads 40,50 of both the front mounting arms 32,34 and also the rear mounting arms 42,44 are four flexible, resilient mounts 52. Referring to FIG. 4, each mount includes a centrally located, cylindrical sleeve 54; a flexible, resilient, medial section 56; and a rigid mounting tab 58. The sleeve is made of steel and is bonded to the medial section 56. The medial section is usually made of rubber and has axial symmetry about the sleeve. The mouting tab 58 is in the form of an apertured disc bonded to the medial section and is made of steel. In this embodiment the four mounts 52 are physically identical; however, different embodiments of the engine isolation system may require flexible resilient mounts having different constructions because of the loading forces hereinafter described. The mounts support the engine and bed plates on the chassis. The mounts also isolate and absorb longitudinal, lateral, and rotational vibrations between the engine and the chassis by resilient damping.

Figure 2:
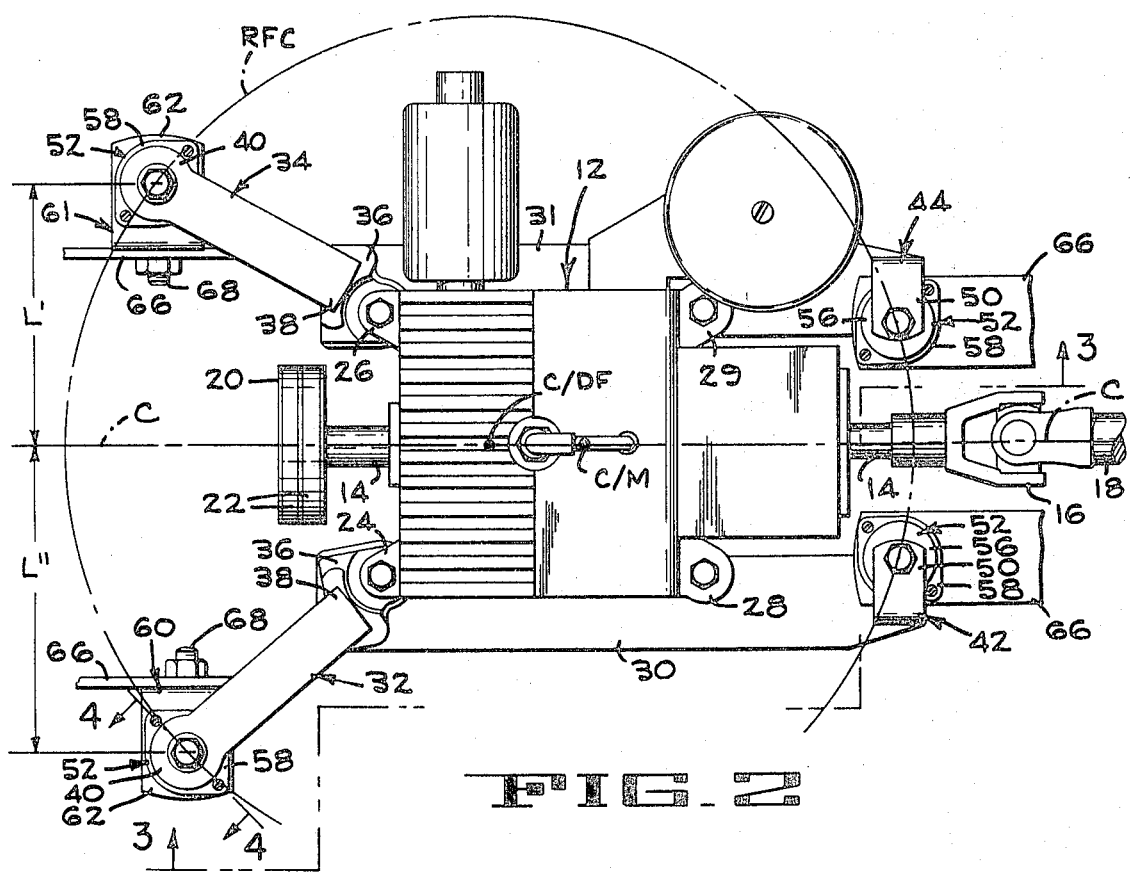
FIG. 2 is a plan view, partially broken away, of the engine isolation system mounted on the frame members of a chassis.

The flexible mounts attached to the front mounting arms 32,34 are bolted by their respective mouting tabs to two chassis brackets 60,61 (FIGS. 1 and 2). Each chassis bracket is generally L-shaped, rectangular in cross section and includes a mount pad 62 having a large diameter hole therein and a vertical portion 64. The chassis brackets may be constructed of any rigid, structural material including steel. Referring to FIG. 4, the mount pad 62 is bolted to the mounting tab 58 of the mount 52 with a portion of the resilient medial section 56 received in the hole. The vertical portions 64 (FIG. 1) of the chassis brackets 60,61 are secured to the chassis 66 by bolts 68. The flexible mounts attached to the rear mounting arms 42,44 are bolted directly to apertured portions of the chassis 66 by mounting tabs 58. Although only portions of the chassis 66 are disclosed in the drawings, it is understood that the portions of the chassis attached to the chassis brackets 60,61 and the portions of the chassis attached to the rear mounting arms 42,44 are part of one, integral, rigid chassis structure.

In the Engine Isolation System the flexible mounts 52 are spacially positioned with respect to the weight force of the engine assembly and the exterior forces acting on the engine assembly due to its power output. The weight force of the engine assembly includes the weights of all of the components that statically bear on the mounting arms. In this embodiment the weight force of the engine assembly includes the weight of the pulley 20, the crankshaft 14, the engine 12, the mounting arms 32,34,42 and 44, the bed plates 30,31 and at least the engine side of the universal joint 16. Referring to FIG. 5, reference letter W represents the vector sum of these individual static or weight forces that comprise the engine assembly. Weight force W acts through the center of mass, C/M, of the entire engine assembly.

The exterior forces acting on the engine assembly due to its power output include the dynamic forces acting on the engine assembly during operation and the static forces acting on the engine assembly due to the power takeoff components. The exterior forces are individually calculated and are not summed. In this embodiment the belts 22 attached to the driving pulley 20 bear downward on the crankshaft 14 at the pulley 20 due to the tension plus the implement driving force between the driving pulley 20 and a driven pulley (not shown). In FIG. 5 this downward belt loading is represented by reference letter B acting through axis D—D at an equivalent lever arm distance from C/M as on the actual engine. The belts 22 also subject the engine to a reaction torque T$b$ due to the power output of the pulley. The weight force of the drive shaft 18, the drive shaft side of the universal joint 16 and any other exterior forces acting through the drive shaft are represented by reference letter S that acts through the center of mass of these components. In FIG. 5 the force S acts through axis D—D at an equivalent lever arm distance from C/M as on the actual engine. The output reaction torque exerted by the drive shaft on the engine is represented by reference letters T$s$. In one embodiment of the Engine Isolation System installed in a garden tractor, over three-quarters of the output power of the engine was transmitted by the belt drive assembly compared to less than one-quarter of the output power transmitted by the drive shaft.

Reference letter R represents a resultant force vector that is equal in magnitude and opposite in direction to a vector sum of the static weight force of the engine assembly and the average forces exterior of the engine acting thereon. In this embodiment resultant vector R is equal in magnitude and opposite in direction to the vector sum of B+W+S. The resultant force vector acts through a center of dynamic forces, C/DF. The center of dynamic forces is that point in the system through which the resultant force vector must act in order to exactly balance the weight or static forces of the engine assembly plus the forces exterior to the engine assembly acting thereon. In this embodiment the center of dynamic forces is located at a point which will balance the moment arms created by B,W, and S. The reaction torques Tb and Ts are not used to locate or to calculate the resultant vector R because each torque acts upwardly on one lateral side of the engine and downwardly on the other lateral side. Hence, there is no net vertical loading along axis C—C.

Having determined the location of the center of dynamic forces, C/DF and the magnitude and direction of the resultant force vector R, the resilient portions of the flexible mounts can be spacially positioned thereabout. In this embodiment of the engine isolation system the four flexible mounts 52 are spacially positioned to describe a generally horizontal dynamic plane Dp (FIG. 6) which passes through the engine and through the resilient, medial portions 56 of each mount. The dynamic plane passes through the center of dynamic forces C/DF and lies orthogonally to the resultant force vector R. Axis D—D lies parallel to axis C—C in dynamic plane D$p$.

To make it possible to use resilient mounts 52 which are identical and are subjected to identical forces, the center of mass C/M is first calculated along with the average output forces B,W and S. Next, the lever arms for the points of application of the dynamic forces B,W and S are determined from the actual dimensions of the engine 12. Then the actual location of the dynamic center of gravity C/DF is computed. The elevation of each resilient mount 52 is thereby found too since the mounts all lie in the common, generally horizontal, dynamic plane Dp. It will be apparent from FIGS. 2, 3 and 6 that the dynamic plane DP (FIG. 6) includes the axis D—D as well as both the center of mass C/M and the center of dynamic forces C/DF.

Each mount 52 is disposed an equal distance from the average dynamic center of forces C/DF and accordingly each must lie on the circumference of a resistance force circle RFC generated about the axis of the dynamic center of forces C/DF. The radius of the circle RFC should be as large as possible, and the position of the mounts 52 on the circle must be determined in accordance with the chassis dimensions and allowable space within which the engine must be mounted. It is, of course, preferable to place the forward mounts and rear mounts approximately symmetrical relative to the longitudinal axis D—D. However, it will be understood that if a high torque load, such as the force B applied at the forward end of the vehicle, is present and is offset to one side of the axis C—C, a substantial, torque compensating, lateral spacing of the adjacent mounts is desirable. Also the forward mount which is on the same side as the laterally offset force (B) may be spaced a greater distance from axis D—D than the opposed mount 52 to compensate for the unbalanced load as calculated from a transverse vector diagram similar to that illustrated in FIG. 5. This type of variable lateral spacing is illustrated in FIG. 2 wherein the right forward mount is spaced a distance L' from the longitudinal axis C—C, and the left forward mount is spaced a greater distance L" to compensate for the substantial downward dynamic force B which is applied at the left hand edge of the pulleys 20. Such offsetting of the forward mounts 52 shifts the point of application of force B transversely to the axis D—D as illustrated in FIG. 5.

Thus, the Engine Isolation System locates the resilient elements of its engine mounts with respect to the forces imposed upon the engine as a result of its power output and the forces acting externally to the engine assembly. The engine is suspended equally by its four mounts 52 and floated about its average dynamic center of gravity or forces C/DF, not its center of mass C/M. The power is extracted from the engine while it is a resiliently damped floating mass with substantially equal forces being applied to each of the flexible mounts 52. By positioning the resilient portions of the engine mounts 52 with respect to the resultant force vector R and the center of dynamic forces C/DF, this engine isolation system is capable of substantially reducing the transmission of vibration between the engine and the chassis and reducing the noise level of the vehicle on which both the engine and the chassis are mounted.

It is understood that different numbers and arrangements of resilient mounts may be employed and that varying the size and type of the power plant and substituting and interchanging the method of power output is contemplated. For example, a chain, a geared transmission and a fluid coupling may all be interchangeably used without departing from the scope of the invention.

Although the best mode contemplated for carrying out the present invention has been herein shown and described, it will be apparent that modification and variation may be made without departing from what is regarded to be the subject matter of the invention.

I claim:

1. An apparatus for supporting an engine assembly on a chassis and for isolating and damping vibration between the engine assembly and the chassis including:
   an engine assembly having mass and subjectable to forces exterior of the engine assembly from the output of power from the engine assembly;
   a chassis on which the engine assembly is mounted; and
   a mounting means for supporting the engine assembly on the chassis and for isolating and damping vibration between the engine assembly and the chassis,
   a pulley and belt means driven by the engine assembly and operatively connected to the chassis, the belt tension causing a static force to act on the engine assembly,
   said mounting means further including a plurality of resilient elements disposed in a common generally horizontal plane near the center of mass, said plane being normal to a resultant force vector and passing through a center of dynamic forces, each of said resilient elements being spaced substantially equal distances away from said center of dynamic forces.
   the resultant force vector being equal in magnitude and opposite in direction to a vector sum of the weight force of the engine assembly and the static forces acting on the engine assembly, the center of dynamic forces being that point through which the resultant force vector must act to balance both the weight force of the engine assembly and the static forces acting on the engine assembly.

2. An apparatus for supporting an engine assembly on a chassis and for isolating and damping vibration between the engine assembly and the chassis including:
   an engine assembly having mass and subjectable to forces exterior of the engine assembly in response to the output of power from the engine assembly;
   a chassis on which the engine assembly is mounted;
   a drive shaft means driven by the engine assembly about an axis and operatively connected to the chassis to produce a transversely balanced torque about said axis;
   a pulley and belt means driven by the engine assembly about said axis and operatively connected to the chassis to produce an uneven torque about said axis including an offset vertical component of driving force,
   said drive shaft means and said pulley and belt means providing separate static forces exterior of and acting on the engine assembly including weight and belt tension; and
   a mounting means for supporting the engine assembly on the chassis and for isolating and damping vibration between the engine assembly and the chassis,
   said mouting means being operatively connected between the engine assembly and the chassis,
   said mouting means further including resilient elements disposed in a common generally horizontal dynamic plane along with the center of mass and a center of dynamic forces and with a resultant force vector passing through the center of dynamic forces and being normal to said plane,
   a first pair of said resilient elements being disposed adjacent said pulley and belt means with the resilient element adjacent said offset vertical force component being further from said axis than the other element of said first pair to compensate for uneven torque loading of said engine assembly, a second pair of resilient elements being disposed adjacent said drive shaft and being spaced equal distances from said axis,
   the resultant force vector being equal in magnitude and opposite in direction to a vector sum of the weight force of the engine assembly and the static forces exterior of the engine assembly acting thereon, and the center of dynamic forces being that point through which the resultant force vector must act to balance the weight force of the engine assembly and the driving forces exterior of the engine assembly acting thereon.

3. An isolation system for supporting a power plant having a longitudinal axis from a chassis and for isolating and damping vibration between the power plant and the chassis comprising; mounting means connecting said power plant to said chassis, a plurality of resilient elements included in said mounting means and interposed between said power plant and said chassis for resiliently supporting said power plant from said chassis, said power plant having one or more mechanical output drives connected thereto for providing torsional output driving forces, said output drives including a pulley and belt drive means, the belt tension causing a static force to act on said power plant through said output drive, said power plant and mechanical drives having a center of mass and further having a resultant force acting at the center of dynamic forces determined by vectorially adding the static forces of the power plant and of said mechanical drives, said resilient elements each lying in a common generally horizontal dynamic plane near the center of mass and containing said center of dynamic forces, each resilient element being mounted on said chassis at the same radial distance from said center of dynamic forces and being approximately symmetrically disposed about said longitudinal axis, each of said resilient elements supporting approximately an equal proportion of the total force applied to said resilient elements during normal operation of the power plant.

4. An isolation system for supporting a power plant having a longitudinal axis from a chassis and for isolating and damping vibration between the power plant and the chassis comprising; mounting means connecting said power plant to said chassis, a plurality of resilient elements included in said mounting means and interposed between said power plant and said chassis for resiliently supporting said power plant from said chassis, said power plant having one or more mechanical output drives connected thereto for providing torsional output driving forces, said power plant and mechanical drives having a center of mass and further having a resultant force acting at the center of dynamic forces determined by vectorially adding the static forces of the power plant end of said mechanical drives, said resilient elements each lying in a common generally horizontal dynamic plane near the center of mass and each being mounted on the chassis at the same radial distance from said center of dynamic forces and being approximately symmetrically disposed about said longitudinal axis, each of said resilient elements supporting approximately an equal proportion of the total force applied to said resilient elements during normal operation of the power plant, one of said output forces being transmitted by a belt and pulley type drive for applying a substantial torsional driving force which has an effective vertical component which is transversely offset from said axis at the radius of said pulley, a pair of said resilient mounts being disposed adjacent said belt drive and being positioned so that the resilient mount on the side of said offset vertical component of force is positioned further from said longitudinal axis than the mount on the other side of the axis for effecting movement of the resultant of the total offset vertical component of force to approximately said longitudinal axis.

5. An isolation system according to claim 4 wherein another of said output forces is transmitted by a driven shaft extending parallel to said axis, and wherein a second pair of said resilient mounts are disposed on opposite sides of said axis adjacent said drive shaft at equally spaced intervals from said axis.

6. An isolation system according to claim 5 wherein said generally horizontal dynamic plane also passes through said center of dynamic forces.

7. An isolation system according to claim 6 wherein four identical resilient mounts are provided.

* * * * *